US011652423B2

(12) United States Patent
Chizuwa

(10) Patent No.: US 11,652,423 B2
(45) Date of Patent: May 16, 2023

(54) SWITCHING POWER SUPPLY DEVICE, VEHICLE, AND CONTROL METHOD

(71) Applicant: Panasonic Intellectual Property Management Co., Ltd., Osaka (JP)

(72) Inventor: Shuhei Chizuwa, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 198 days.

(21) Appl. No.: 17/065,390

(22) Filed: Oct. 7, 2020

(65) Prior Publication Data
US 2021/0126547 A1    Apr. 29, 2021

(30) Foreign Application Priority Data

Oct. 24, 2019    (JP) .............................. JP2019-193755

(51) Int. Cl.
*H02M 7/06* (2006.01)
*H02M 1/32* (2007.01)
*H02M 7/155* (2006.01)
*B60L 53/22* (2019.01)

(52) U.S. Cl.
CPC ............. *H02M 7/062* (2013.01); *H02M 1/32* (2013.01); *H02M 7/1557* (2013.01); *B60L 53/22* (2019.02)

(58) Field of Classification Search
CPC ...... H02M 1/32; H02M 7/062; H02M 7/1557; B60L 53/22
See application file for complete search history.

(56) References Cited

U.S. PATENT DOCUMENTS

| 10,270,360 | B2 | 4/2019 | Tazaki et al. | |
| 10,587,205 | B2 | 3/2020 | Tazaki et al. | |
| 2015/0115888 | A1* | 4/2015 | Biagini | H02J 7/02 |
| | | | | 320/109 |
| 2019/0036462 | A1* | 1/2019 | Tazaki | H02M 7/06 |

FOREIGN PATENT DOCUMENTS

| JP | 2017-169350 A | | 9/2017 | |
| JP | 2017169350 A | * | 9/2017 | ............. H02M 1/32 |
| WO | WO 2019170457 A1 | | 9/2019 | |

OTHER PUBLICATIONS

Office Action, dated Apr. 4, 2023, for Japanese Patent Application No. 2019-193755. (18 pages) (with English Translation).

* cited by examiner

Primary Examiner — Jue Zhang
(74) Attorney, Agent, or Firm — Seed IP Law Group LLP

(57) ABSTRACT

A switching power supply device according to an embodiment of the present disclosure includes: power supply circuits corresponding to phases of a polyphase AC power supply as an external power supply; a switching circuit configured to switch a connection destination of another power supply circuit other than a specific power supply circuit corresponding to a specific phase of the external power supply among the power supply circuits to a phase corresponding to the other power supply circuit or the specific phase; and a control unit configured to connect, to each phase of the external power supply connected to the switching power supply device, the other power supply circuit corresponding to the phase, and connect the other power supply circuit as a surplus to the specific phase when the number of phases of the external power supply is smaller than the number of the power supply circuits.

9 Claims, 12 Drawing Sheets

SWITCHING POWER SUPPLY DEVICE, VEHICLE, AND CONTROL METHOD

CROSS-REFERENCE TO RELATED APPLICATIONS

This application is based upon and claims the benefit of priority from Japanese Patent Application No. 2019-193755, filed Oct. 24, 2019, the entire contents of which are incorporated herein by reference.

FIELD

Embodiments described herein relate generally to a switching power supply device, a vehicle, and a control method.

BACKGROUND

In the related art, there is known a switching power supply device that can convert AC power from a single-phase or polyphase AC power supply into DC power (for example, Japanese Patent Application Laid-open No. 2017-169350).

The switching power supply device disclosed in Japanese Patent Application Laid-open No. 2017-169350 includes three power conversion lines disposed in parallel each of which has a noise filter and a power converter.

This switching power supply device charges a battery, in accordance with the number of phases of an AC power supply to be connected, by connecting the power conversion line corresponding to each phase to the external AC power supply.

In this way, by configuring the switching power supply device to be able to be connected to any of a single-phase AC power supply and a polyphase AC power supply, the battery is enabled to be charged with any infrastructure of a single-phase power supply and a polyphase power supply.

However, with the configuration of the switching power supply device in the related art, capacity of reducing noise may be insufficient in some cases.

SUMMARY

A switching power supply device according to an embodiment of the present disclosure includes a plurality of power supply circuits, a switching circuit, and a control unit. The power supply circuits correspond to respective phases of a polyphase AC power supply as an external power supply, each of the power supply circuits including a filter circuit. The switching circuit is configured to be able to switch a connection destination of another power supply circuit other than a specific power supply circuit corresponding to a specific phase of the external power supply among the power supply circuits to a phase corresponding to the other power supply circuit or the specific phase. The control unit is configured to control the switching circuit in accordance with a number of phases of the external power supply connected to the switching power supply device. The control unit is configured to connect, to each phase of the external power supply connected to the switching power supply device, the other power supply circuit corresponding to the phase, and connect the other power supply circuit as a surplus to the specific phase when the number of phases of the external power supply connected to the switching power supply device is smaller than a number of the power supply circuits.

DETAILED DESCRIPTION

The following describes embodiments of the present disclosure in detail with reference to the drawings.

First Embodiment

Figure 1:
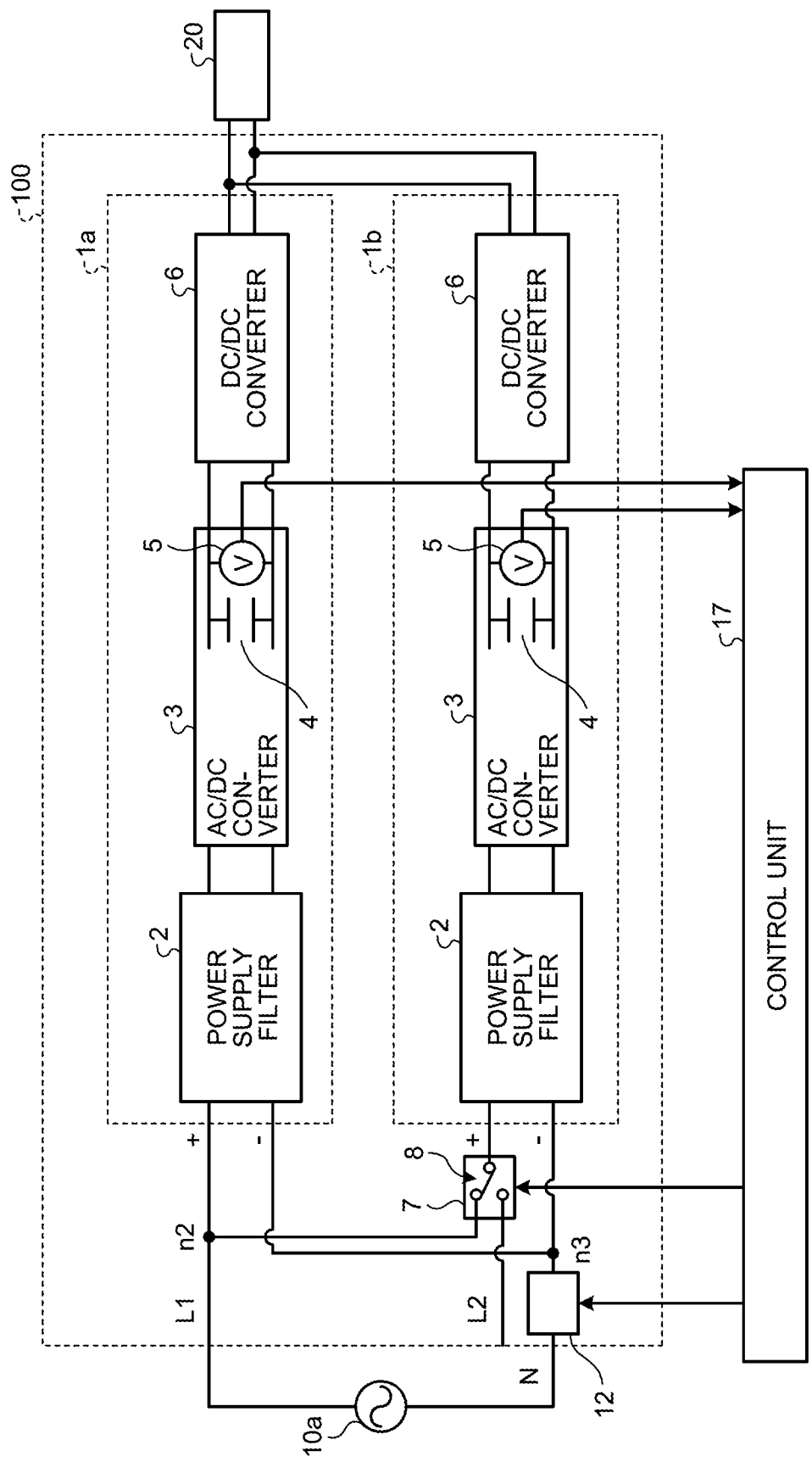
FIG. 1 is a circuit diagram illustrating a case in which a switching power supply device according to a first embodiment is connected to a single-phase AC power supply.

First, the following describes an example of a configuration of a switching power supply device 100 according to the present embodiment. FIG. 1 is a circuit diagram illustrating a configuration example of the switching power supply device 100. For example, the switching power supply device 100 is used for a charging device of a vehicle such as an electric vehicle and a hybrid vehicle.

Configuration of Switching Power Supply Device 100

Figure 2:
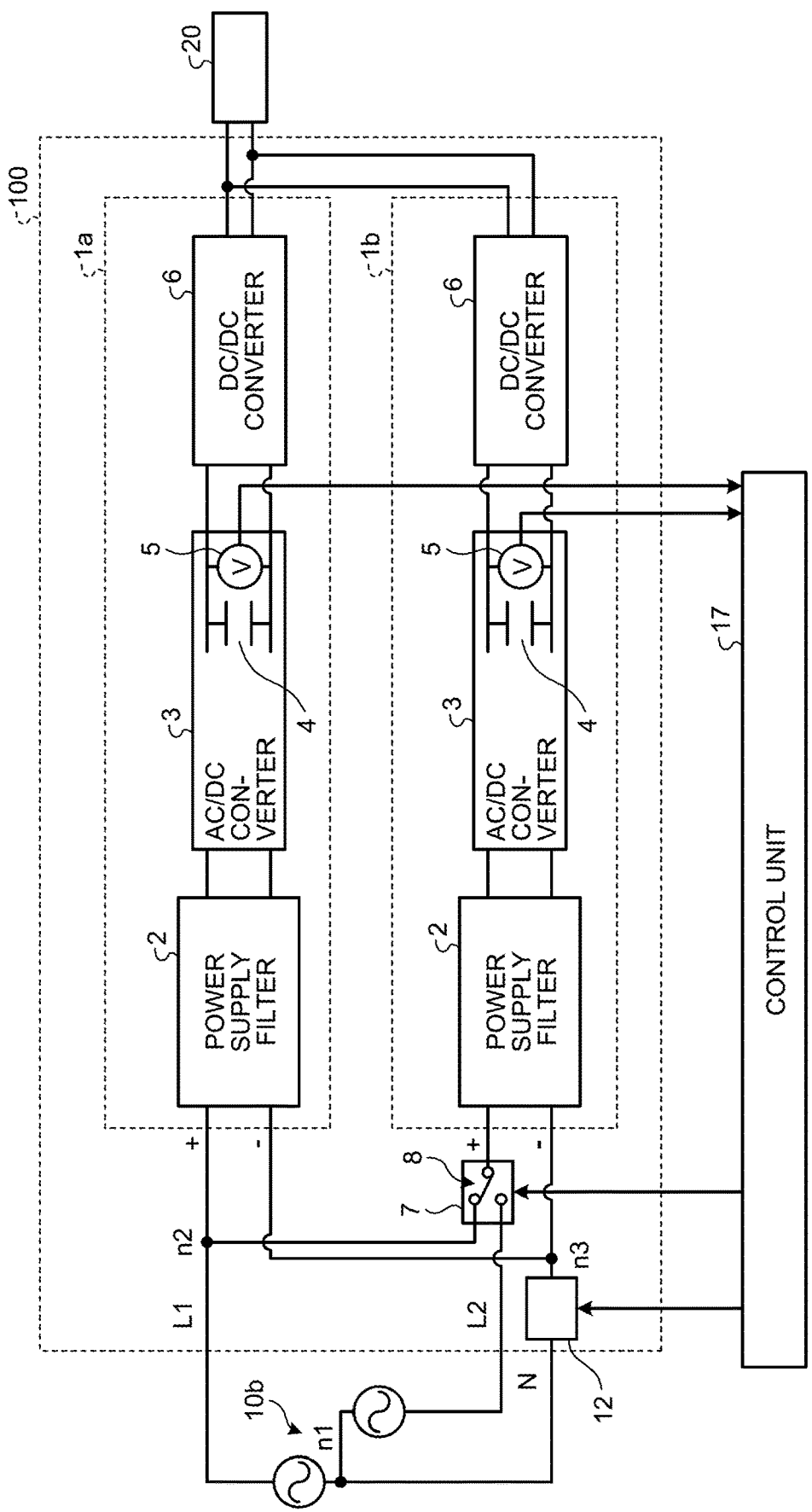
FIG. 2 is a circuit diagram illustrating a case in which the switching power supply device according to the first embodiment is connected to a two-phase AC power supply.
Figure 3:
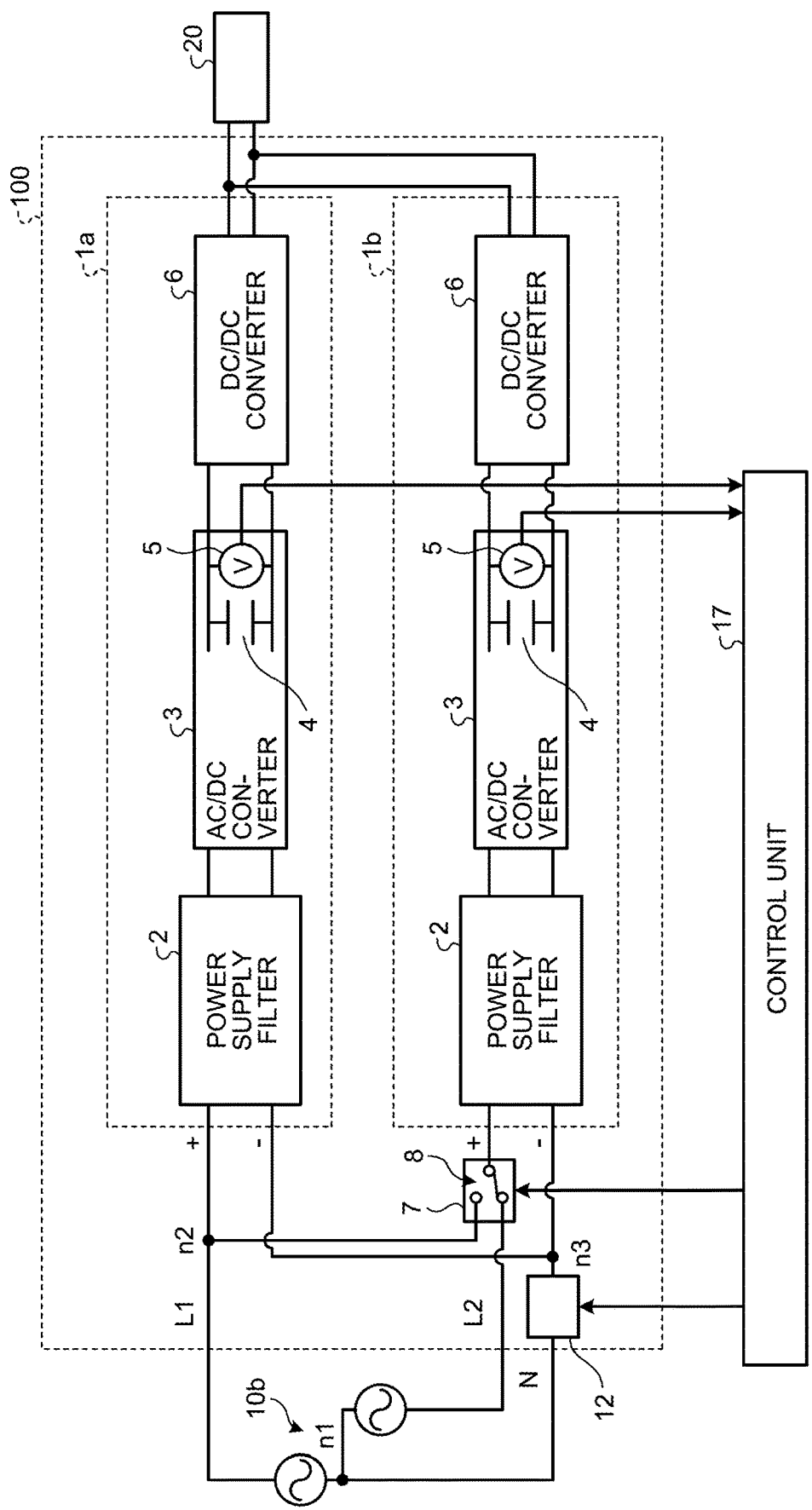
FIG. 3 is a circuit diagram illustrating a case in which the switching power supply device according to the first embodiment is connected to the two-phase AC power supply.

The switching power supply device 100 is a device that converts AC power from an AC power supply into DC power to be output to a battery 20. By way of example, FIG. 1 illustrates a case in which the switching power supply device 100 is connected to a single-phase AC power supply 10a, but the switching power supply device 100 may be connected to a two-phase AC power supply 10b as illustrated in FIG. 2 and FIG. 3. The switching power supply device 100 according to the present embodiment is configured to be compatible with the single-phase AC power supply 10a and the two-phase AC power supply 10b. Hereinafter, in a case in which the single-phase AC power supply 10a and the two-phase AC power supply 10b (a three-phase AC power supply 10c described later) are not required to be distinguished from each other, they are simply referred to as an "AC power supply". Additionally, the two-phase AC power supply 10b and the three-phase AC power supply 10c are also referred to as a "polyphase AC power supply".

The battery 20 is, for example, a battery for driving a motor of a vehicle. The battery 20 is a high rate battery, and examples thereof include a lithium ion battery. Alternatively, the battery 20 may be a battery used for a cellular telephone, electric appliances, and the like other than a vehicle, for example.

The switching power supply device 100 includes a power supply circuit 1a, a power supply circuit 1b, a switching circuit 7, a rush current prevention circuit 12, and a control unit 17. In the present embodiment, the switching power supply device 100 has a configuration including two power supply circuits (the power supply circuits 1a and 1b) so as to be compatible with the single-phase AC power supply 10a and the two-phase AC power supply 10b.

Each of the power supply circuits 1a and 1b includes a power supply filter 2, an AC/DC converter 3, and a DC/DC converter 6. The power supply filter 2 is an example of a filter circuit in CLAIMS. The power supply circuits 1a and 1b are connected to the AC power supply via power supply lines L1 and L2, respectively.

AC power is input to the power supply filter 2 from the AC power supply. The power supply filter 2 prevents noise from entering the power supply line, and prevents outflow of noise to an external AC power supply.

The AC/DC converter 3 is disposed at a rear stage of the power supply filter 2 (on the battery 20 side). The AC/DC converter 3 converts AC power from the power supply filter 2 into DC power to be output to the DC/DC converter 6.

The AC/DC converter 3 includes an electrolytic capacitor 4, and a voltmeter 5 for measuring voltage of the electrolytic capacitor 4. The voltmeter 5 measures the voltage of the electrolytic capacitor 4 at the time when the electrolytic capacitor 4 is initially charged (precharged). A voltage value measured by the voltmeter 5 is output to the control unit 17. The electrolytic capacitor 4 corresponds to an output capacitor in CLAIMS.

The voltmeter 5 is disposed in each of the power supply circuit 1a and the power supply circuit 1b. By detecting the voltage value of the voltmeter 5, the control unit 17 can determine which of the single-phase AC power supply 10a and the two-phase AC power supply 10b is connected to the switching power supply device 100.

The voltmeter 5 is not an indispensable configuration in the present embodiment. For example, by separately disposing a current sensor in the AC/DC converter 3 to output a current value to the control unit 17, the control unit 17 can determine which of the single-phase AC power supply 10a and the two-phase AC power supply 10b is connected to the switching power supply device 100 without using the voltmeter 5. In a case of separately disposing the current sensor, an installation place of the current sensor is not limited to the inside of the AC/DC converter 3.

Alternatively, by newly disposing another voltmeter at a rear stage of the AC/DC converter 3 separately from the voltmeter 5, the control unit 17 may determine which of the single-phase AC power supply 10a and the two-phase AC power supply 10b is connected to the switching power supply device 100 based on a voltage value of the other voltmeter. In a case of newly disposing another voltmeter separately, an installation place of the other voltmeter is not limited to the rear stage of the AC/DC converter 3.

As another method, by disposing a communication module for communicating with the AC power supply, which of the single-phase AC power supply 10a and the two-phase AC power supply 10b is connected to the switching power supply device 100 may be determined based on information related to the AC power supply transmitted from the communication module.

The DC/DC converter 6 is disposed at a rear stage of the AC/DC converter 3 (on the battery 20 side). The DC/DC converter 6 transforms DC voltage applied from the AC/DC converter 3 into another DC voltage value having a different voltage value to be output to the battery 20.

The switching circuit 7 is a circuit that switches between a first mode in which only the power supply circuit 1a is driven in a case in which the switching power supply device 100 is connected to the single-phase AC power supply 10a and a second mode in which the power supply circuit 1a and the power supply circuit 1b are driven in a case in which the switching power supply device 100 is connected to the two-phase AC power supply 10b.

In other words, the switching circuit 7 can switch, of the power supply circuits 1a and 1b, a connection destination of another power supply circuit (the power supply circuit 1b) other than a specific power supply circuit (the power supply circuit 1a) corresponding to a specific phase (for example, the power supply line L1) of the polyphase AC power supply to the phase (the power supply line L2) corresponding to the other power supply circuit (the power supply circuit 1b) or the specific phase (the power supply line L1).

The switching circuit 7 includes a switching relay 8, a coil (not illustrated), and a drive circuit (not illustrated). The drive circuit switches ON/OFF of the switching relay 8 in accordance with a control signal from the control unit 17. This control signal is a signal indicating to turn ON the switching relay 8 or to turn OFF the switching relay 8. The switching circuit 7 is an example of a switching circuit described in CLAIMS.

An OFF state of the switching relay 8 means a state in which the switching relay 8 is connected to the power supply line L1 branched at a branch point n2 as illustrated in FIG. 1 and FIG. 2. On the other hand, an ON state of the switching relay 8 means a state in which the switching relay 8 is connected to the power supply line L2 as illustrated in FIG. 3. The branch point n2 is a point (position) on the power supply line L1 (the first phase) on a positive side.

The control unit 17 is constituted of, for example, a processor such as a central processing unit (CPU), a read only memory (ROM), a random access memory (RAM), and the like.

The rush current prevention circuit 12 is disposed to be closer to the AC power supply side than a joining point (connection point) n3 of a negative side line of the power supply circuit 1a and the negative side line of the power supply circuit 1b, and limits a rush current. The joining point n3 is a point on a current line N on the negative side. With this configuration, the rush current prevention circuit 12 is not required to be disposed for each line, so that the switching power supply device 100 can be downsized.

Figure 4:
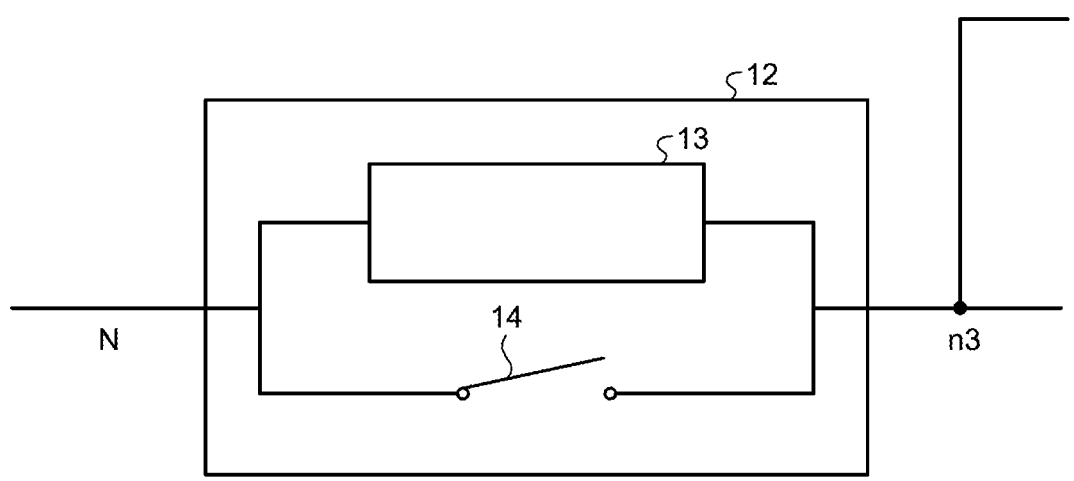
FIG. 4 is a diagram illustrating a configuration example of a rush current prevention circuit of the switching power supply device according to the first embodiment.

FIG. 4 is a diagram illustrating a configuration example of the rush current prevention circuit 12. The rush current prevention circuit 12 includes a rush current limiting circuit 13 constituted of a fuse (not illustrated), a rush current limiting resistor, and the like, a rush prevention relay 14, a coil (not illustrated), and a drive circuit (not illustrated). The drive circuit switches ON/OFF of the rush prevention relay 14 in accordance with a control signal from the control unit 17.

This control signal is a signal indicating to turn ON the rush prevention relay 14 or to turn OFF the rush prevention relay 14. By way of example, FIG. 4 illustrates a case in which the rush prevention relay 14 is in the OFF state. The control unit 17 generates the control signal when the processor such as a CPU described above cooperates with a computer program (software) stored in a ROM, for example. The function of the control unit 17 is not necessarily implemented by software, and may also be implemented by a hardware configuration such as a dedicated circuit.

The rush current prevention circuit 12 is not necessarily disposed to be closer to the single-phase AC power supply 10*a* side than the joining point n3, and may be disposed at another position. For example, the rush current prevention circuit 12 may be disposed in each of the negative side line of the power supply circuit 1*a* and the negative side line of the power supply circuit 1*b*.

The control unit 17 controls the switching circuit 7 in accordance with the number of phases of the external power supply (AC power supply) connected to the switching power supply device 100.

The example of the configuration of the switching power supply device 100 has been described above.

Operation of Switching Power Supply Device 100

Figure 5:
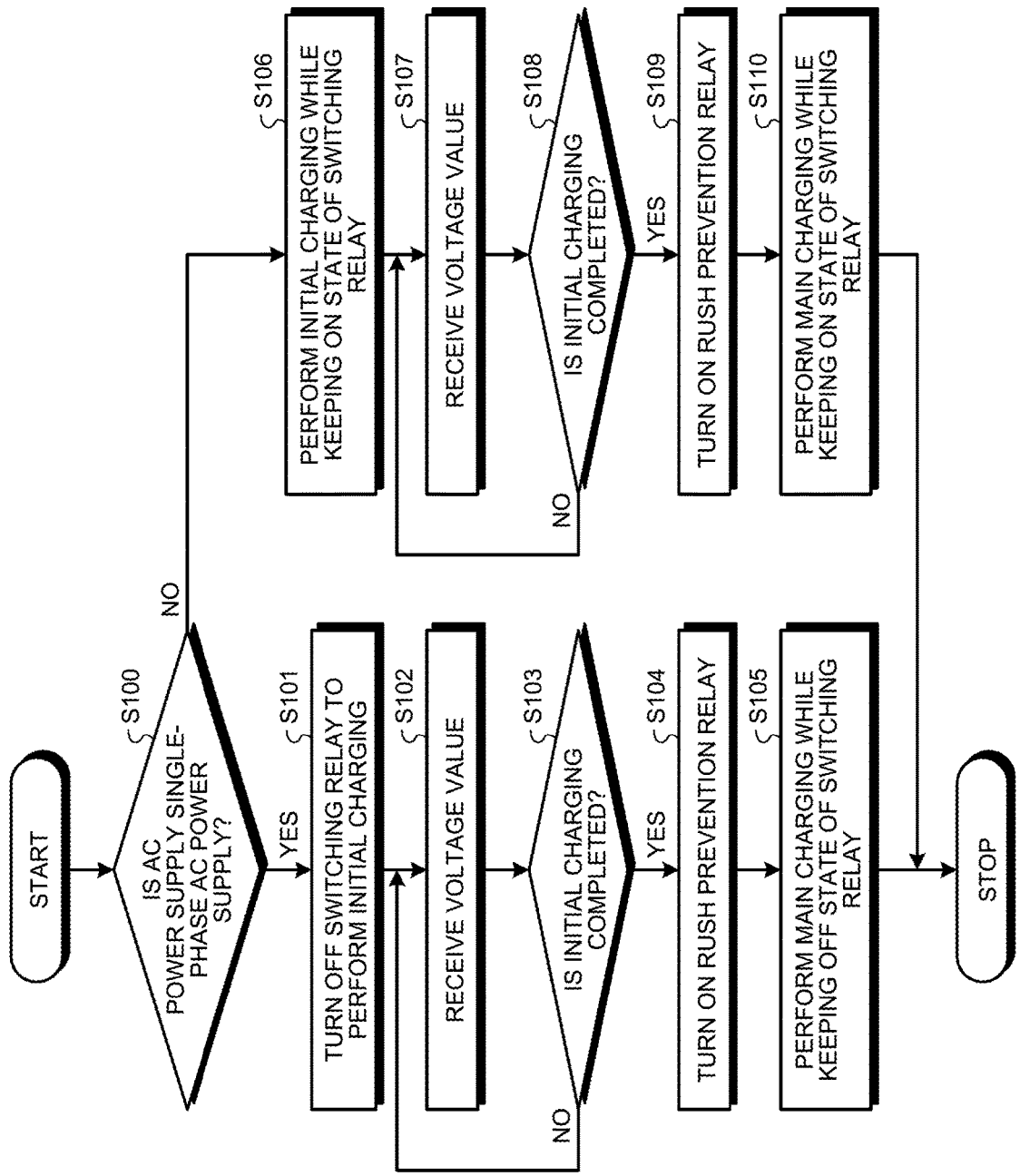
FIG. 5 is a flowchart illustrating an operation example of the switching power supply device according to the first embodiment.

Next, the following describes an example of an operation of the switching power supply device 100 with reference to FIG. 5. FIG. 5 is a flowchart illustrating an operation example of the switching power supply device 100. The operation described below is started at the time of connection of the AC power supply.

First, the control unit 17 determines specifications of the connected AC power supply. Specifically, the control unit 17 determines whether the AC power supply is the single-phase AC power supply 10*a* or the two-phase AC power supply 10*b* (Step S100).

The control unit 17 determines whether the AC power supply is the single-phase AC power supply 10*a* or the two-phase AC power supply 10*b* based on a voltage value output from the voltmeter 5 that measures the voltage of the electrolytic capacitor 4, for example.

At the time of start of the flowchart, the switching relay 8 is in an ON state as illustrated in FIG. 3. Thus, in a case in which the switching power supply device 100 is connected to the single-phase AC power supply 10*a* (in a case in which the positive side of the single-phase AC power supply 10*a* is connected to the power supply line L1, for example), a positive voltage value is output to the control unit 17 from the voltmeter 5 that measures the voltage of the electrolytic capacitor 4 included in the power supply circuit 1*a*.

The single-phase AC power supply is not connected to the power supply circuit 1*b* (the positive side of the single-phase AC power supply 10*a* is not connected to the power supply line L2), so that a voltage value of 0 is output to the control unit 17 from the voltmeter 5 that measures the voltage of the electrolytic capacitor 4 included in the power supply circuit 1*b*.

In contrast, in a case in which the switching power supply device 100 is connected to the two-phase AC power supply 10*b* (in a case in which positive sides of respective phases of the two-phase AC power supply 10*b* are connected to the power supply line L1 and the power supply line L2), positive voltage values are output to the control unit 17 from both of the voltmeter 5 that measures the voltage of the electrolytic capacitor 4 included in the power supply circuit 1*a* and the voltmeter 5 that measures the voltage of the electrolytic capacitor 4 included in the power supply circuit 1*b*.

Thus, the control unit 17 can detect whether the switching power supply device 100 is connected to the single-phase AC power supply 10*a* or connected to the two-phase AC power supply 10*b* based on the voltage values output from the respective voltmeters 5.

For example, in a case in which a voltage value equal to or smaller than a threshold set in advance is output from one of the voltmeters 5 respectively included in the power supply circuit 1*a* and the power supply circuit 1*b*, it is determined that the switching power supply device 100 is connected to the single-phase AC power supply 10*a*. For example, in a case in which voltage values larger than the threshold set in advance are output from all of the voltmeters 5 respectively included in the power supply circuit 1*a* and the power supply circuit 1*b*, it is determined that the switching power supply device 100 is connected to the two-phase AC power supply 10*b*.

As described above, the control unit 17 may determine whether the switching power supply device 100 is connected to the single-phase AC power supply 10*a* or connected to the two-phase AC power supply 10*b* using a voltmeter other than the voltmeter 5 or an ammeter.

Next, the control unit 17 performs initial charging of the electrolytic capacitor 4 of the AC/DC converter 3 in accordance with the determined specifications of the AC power supply.

As illustrated in FIG. 1, in a case in which the switching power supply device 100 is connected to the single-phase AC power supply 10*a* (Yes at Step S100), the control unit 17 switches the switching relay 8 to be in the OFF state to perform initial charging (Step S101).

At the time of start of the flowchart, the switching relay 8 is in the ON state, and the rush prevention relay 14 of the rush current prevention circuit 12 is in the OFF state as illustrated in FIG. 4.

The reason why the switching relay 8 is in the ON state at the time of start is that the switching power supply device 100 is short-circuited in a case of being connected to the two-phase AC power supply 10*b*. The reason why the rush prevention relay 14 is in the OFF state at the time of start is that the electrolytic capacitor 4 of the AC/DC converter 3 is discharged at the time of connection of the AC power supply, so that a potential difference between the AC power supply and the electrolytic capacitor 4 is large, and a rush current flows into the electrolytic capacitor 4 accordingly.

The rush prevention relay 14 is in the OFF state, so that electric power supplied from the single-phase AC power supply 10*a* is supplied to the power supply circuit 1*a* via the power supply line L1, and supplied to the rush current limiting circuit 13 of the rush current prevention circuit 12.

Due to this, charging (initial charging) of the electrolytic capacitor 4 of the power supply circuit 1*a* can be performed while preventing the rush current from flowing into the power supply circuit 1*a*.

After the control described above, the control unit 17 receives the voltage value of the electrolytic capacitor 4 measured by the voltmeter 5 (Step S102). The control unit 17 receives the voltage value from the voltmeter 5 at a timing when a predetermined time has elapsed after the control unit 17 switches the switching relay 8 to be in the OFF state (Step S101). After the control unit 17 receives the voltage value, the process proceeds to Step S103.

Next, the control unit 17 determines whether initial charging of the electrolytic capacitor 4 is completed by comparing the voltage value received from the voltmeter 5 with the threshold set in advance (Step S103). In a case in which the voltage value received from the voltmeter 5 is equal to or smaller than the threshold (No at Step S103), the process returns to Step S102.

On the other hand, in a case in which the voltage value received from the voltmeter 5 is larger than the threshold (Yes at Step S103), the control unit 17 determines that initial charging of the electrolytic capacitor 4 is completed. At this point, the control unit 17 switches the rush prevention relay 14 to be in the ON state (Step S104).

The control unit 17 then performs charging (main charging) of the battery 20 while keeping the OFF state of the switching relay 8 (Step S105). In other words, the control unit 17 controls the switching circuit 7 in a case in which the switching power supply device 100 is connected to the single-phase AC power supply 10a to connect the other power supply circuit (the power supply circuit 1b) other than the specific power supply circuit (the power supply circuit 1a) to the specific phase (for example, the power supply line L1) corresponding to the single-phase AC power supply 10a.

By charging the battery 20 while causing the switching relay 8 to be in the OFF state, the battery 20 is charged while not only the power supply filter 2 included in the power supply circuit 1a but also the power supply filter 2 included in the power supply circuit 1b are connected to the single-phase AC power supply 10a. Thus, as compared with a case of performing charging by using only the power supply filter 2 included in the power supply circuit 1a, performance of reducing noise can be improved.

The power supply filter 2 included in the power supply circuit 1b connected to the single-phase AC power supply 10a is originally included in the switching power supply device 100, so that a noise filter is not required to be newly disposed, and an advantageous effect of preventing cost from being increased and preventing the size of the device from being increased can be exhibited.

As the power supply filter 2, for example, an X capacitor or a Y capacitor is used. The X capacitor is a capacitor that mainly removes normal mode (differential mode) noise in the switching power supply device 100, and the Y capacitor is a capacitor that mainly removes common mode noise in the switching power supply device 100. The Y capacitor is connected to a vehicle body (frame ground).

In a case of using the X capacitor or the Y capacitor as the power supply filter 2, by connecting not only the power supply filter 2 included in the power supply circuit 1a but also the power supply filter 2 included in the power supply circuit 1b to the single-phase AC power supply 10a at the time of charging the battery 20, capacitance of the capacitor is increased, so that performance of reducing noise can be improved.

As the power supply filter 2, a noise filter such as a core or a coil may be used in place of the capacitor. Similarly to the case of using the capacitor, also in a case of using the noise filter, performance of reducing noise can be improved in a case in which the switching power supply device 100 is connected to the single-phase AC power supply 10a.

On the other hand, in a case in which the switching power supply device 100 is connected to the two-phase AC power supply 10b (No at Step S100), the control unit 17 performs initial charging while keeping the ON state of the switching relay 8 as illustrated in FIG. 3 (Step S106).

Also in a case in which the switching power supply device 100 is connected to the two-phase AC power supply 10b, the rush prevention relay 14 is in the OFF state. Thus, electric power supplied from the two-phase AC power supply 10b is supplied to the power supply circuit 1a and the power supply circuit 1b via the power supply line L1 and the power supply line L2, and supplied to the rush current limiting resistor of the rush current limiting circuit 13.

In other words, a circuit configuration is made such that the power supply circuit 1a, the power supply circuit 1b, and the rush current limiting circuit 13 are connected between a neutral point n1 of the two-phase AC power supply 10b and the first phase (the power supply line L1) (refer to FIG. 3).

Thus, charging (initial charging) of the electrolytic capacitors 4 of the power supply circuit 1a and the power supply circuit 1b can be performed while preventing a rush current from flowing into the power supply circuit 1a and the power supply circuit 1b by the rush current limiting circuit 13.

After the control described above, the control unit 17 receives the voltage value of the electrolytic capacitor 4 measured by the voltmeter 5 (Step S107).

Next, the control unit 17 determines whether initial charging of the electrolytic capacitor 4 is completed by comparing the voltage value received from the voltmeter 5 with the threshold set in advance (Step S108). In a case in which the voltage value received from the voltmeter 5 is equal to or smaller than the threshold (No at Step S108), the process returns to Step S107.

On the other hand, in a case in which the voltage values received from the voltmeters 5 respectively disposed in the power supply circuits 1a and 1b are both larger than the threshold (Yes at Step S108), the control unit 17 determines that initial charging of the electrolytic capacitors 4 respectively disposed in the power supply circuits 1a and 1b is completed. At this point, the control unit 17 switches the rush prevention relay 14 to be in the ON state (Step S109).

The control unit 17 then performs charging (main charging) of the battery 20 while keeping the ON state of the switching relay 8 (Step S110).

The example of the operation of the switching power supply device 100 has been described above.

In the present embodiment, in the switching power supply device 100 compatible with the single-phase AC power supply 10a or the two-phase AC power supply 10b, the control unit 17 connects, to each phase of the AC power supply, the other power supply circuit corresponding to the phase, and in a case in which the number of phases of the AC power supply is smaller than the number of the power supply circuits, connects another power supply circuit as a surplus to the specific phase.

That is, the control unit 17 controls the switching circuit 7 to connect the other power supply circuit (the power supply circuit 1b) other than the specific power supply circuit (the power supply circuit 1a) corresponding to the specific phase (the power supply line L1) to the phase (the power supply line L2) corresponding to the other power supply circuit (the power supply circuit 1b) in a case in which the AC power supply (the two-phase AC power supply 10b) having the same number of phases as the number of the power supply circuits is connected, and to connect another power supply circuit as a surplus (the power supply circuit 1b) to the specific phase (the power supply line L1) in a case in which the AC power supply (the single-phase AC power supply 10a) having the number of phases smaller than the number of the power supply circuits is connected.

Due to this, in a case in which the single-phase AC power supply 10a is connected, the switching power supply device 100 can perform charging by using not only the power supply filter 2 included in the power supply circuit 1a but also the power supply filter 2 included in the power supply circuit 1b, so that performance of reducing noise can be improved.

Second Embodiment

Next, the following describes an example of a configuration of a switching power supply device 200 according to the present embodiment.

Configuration of Switching Power Supply Device 200

Figure 6:
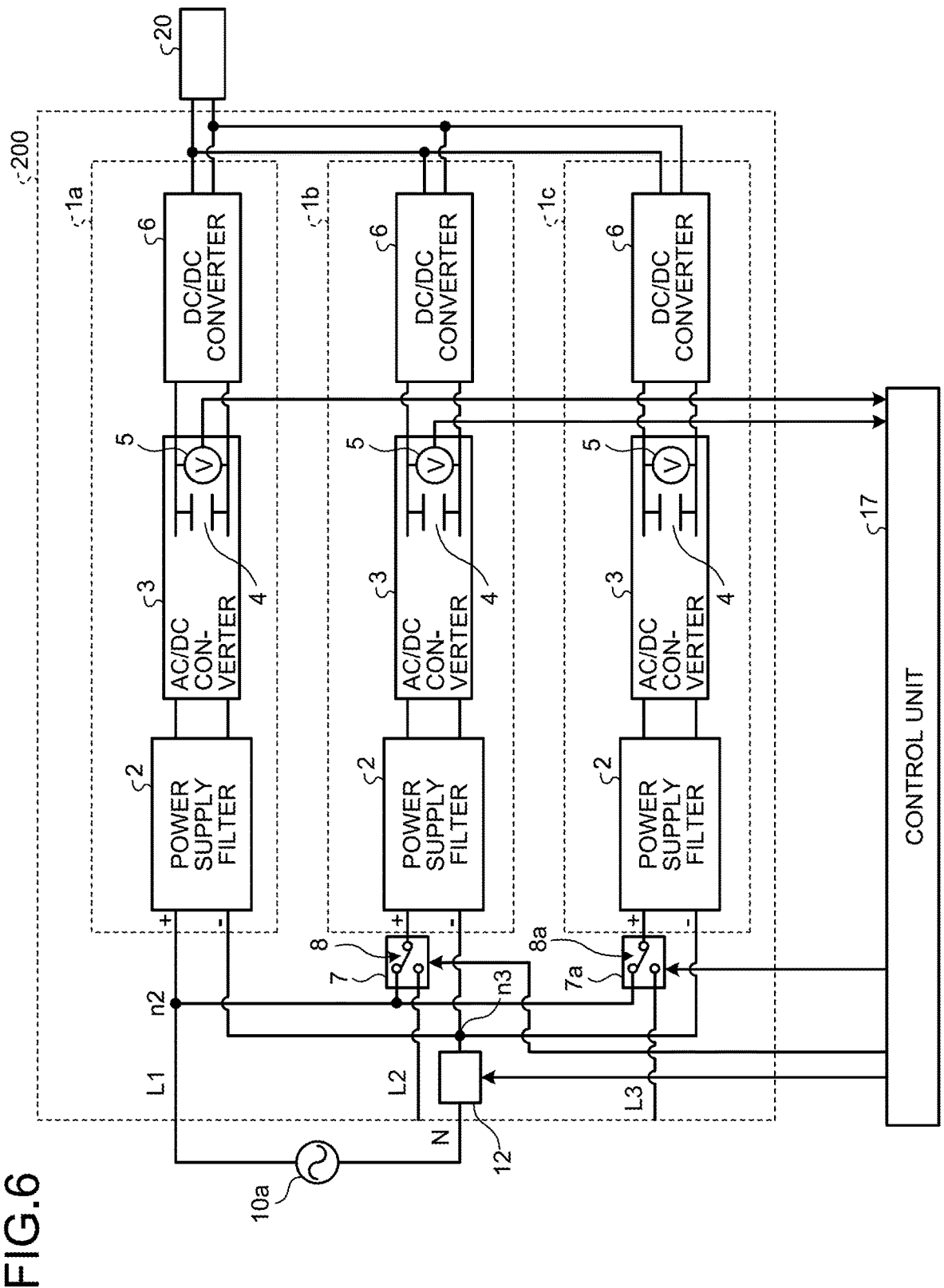
FIG. 6 is a circuit diagram illustrating a case in which a switching power supply device according to a second embodiment is connected to a single-phase AC power supply.

FIG. 6 is a circuit diagram illustrating a configuration example of the switching power supply device 200. The switching power supply device 200 has a configuration including three power supply circuits (the power supply circuits 1a to 1c) to be compatible with a three-phase AC power supply. In FIG. 6, the same constituent elements as those in FIG. 1 are denoted by the same reference numerals, and description thereof will not be repeated.

For example, the switching power supply device 200 is used for a charging device of a vehicle such as an electric vehicle and a hybrid vehicle.

The switching power supply device 200 is different from the switching power supply device 100 illustrated in FIG. 1 in that the power supply circuit 1c and a switching circuit 7a are added. The power supply circuit 1c has the same configuration as that of the power supply circuits 1a and 1b. The switching circuit 7a has the same configuration as that of the switching circuit 7, and ON/OFF of the switching relay 8 is controlled by the control unit 17. The switching circuit 7 and the switching circuit 7a are examples of a switching circuit described in CLAIMS.

When a switching relay 8a of the switching circuit 7a is in the OFF state, the power supply circuit is connected to the power supply line L1 branched at the branch point n2 as illustrated in FIG. 6. On the other hand, when the switching relay 8a of the switching circuit 7a is in the ON state, the power supply circuit is connected to the power supply line L3.

Figure 7:
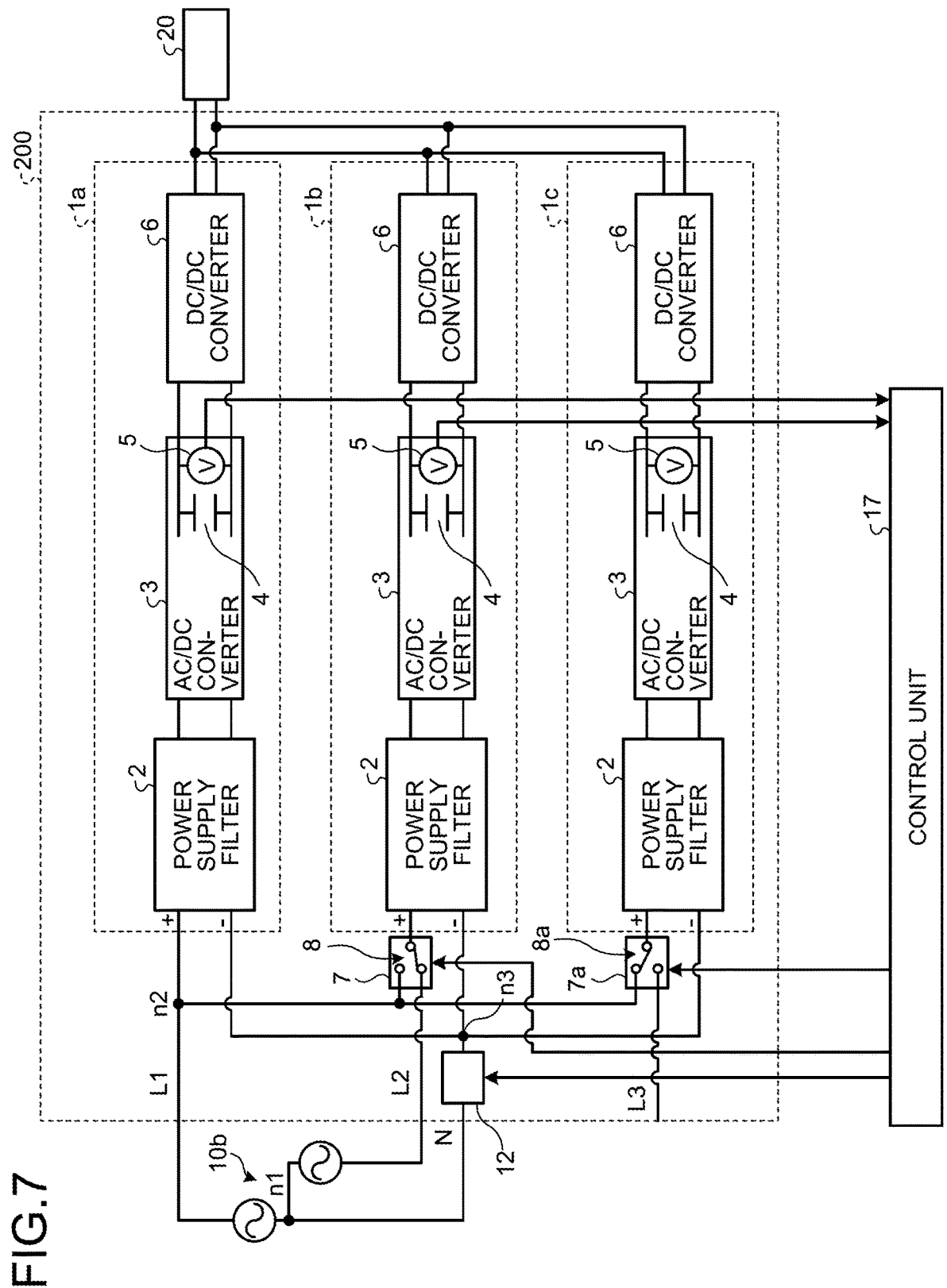
FIG. 7 is a circuit diagram illustrating a case in which the switching power supply device according to the second embodiment is connected to a two-phase AC power supply.
Figure 8:
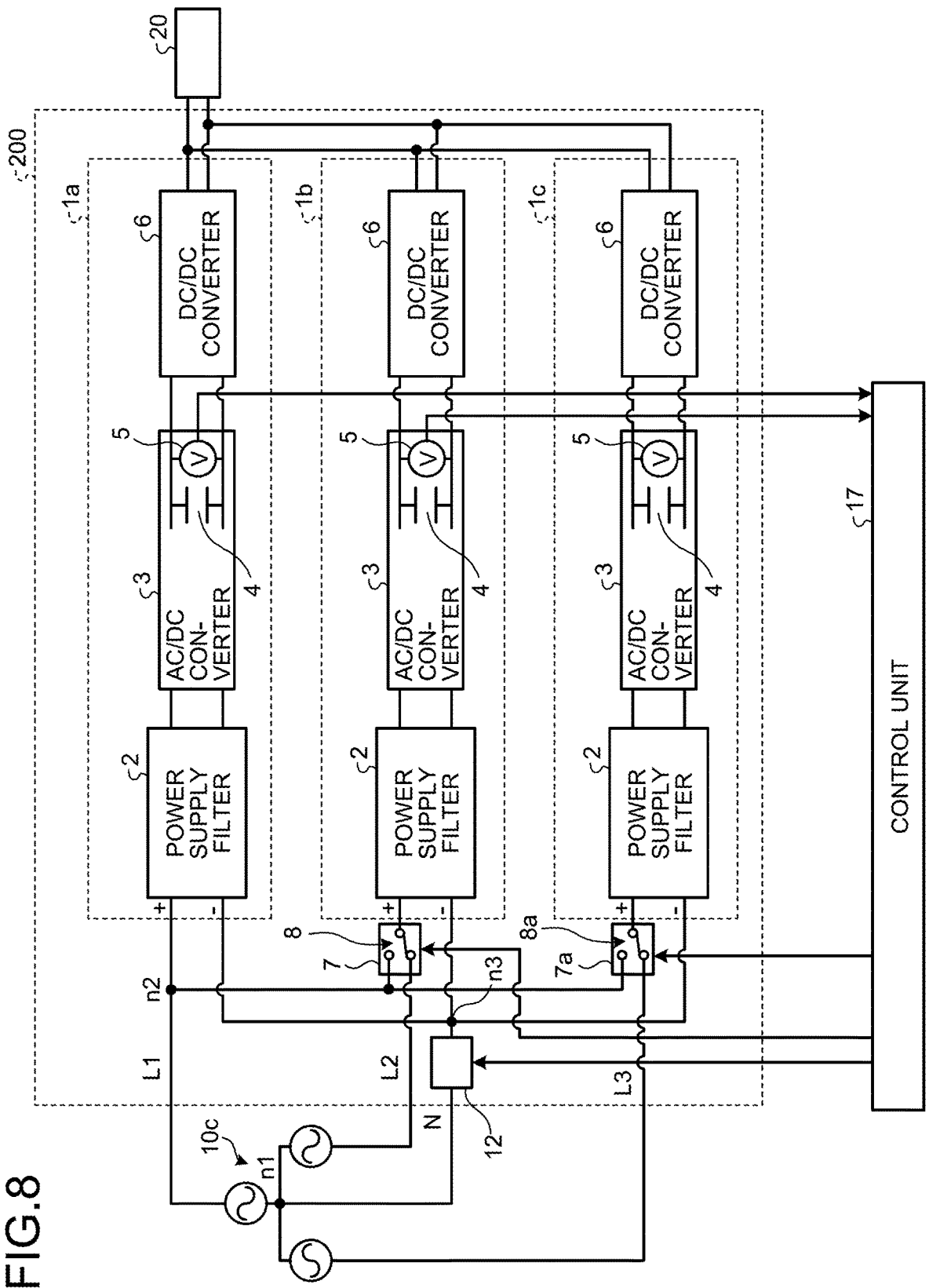
FIG. 8 is a circuit diagram illustrating a case in which the switching power supply device according to the second embodiment is connected to a three-phase AC power supply.

By way of example, FIG. 6 illustrates a case in which the switching power supply device 200 is connected to the single-phase AC power supply 10a, but the switching power supply device 200 may be connected to the two-phase AC power supply 10b as illustrated in FIG. 7, or may be connected to the three-phase AC power supply 10c as illustrated in FIG. 8. The switching power supply device 200 according to the present embodiment has a configuration compatible with the single-phase AC power supply 10a, the two-phase AC power supply 10b, and the three-phase AC power supply 10c.

The rush current prevention circuit 12 is disposed to be closer to the AC power supply side than the joining point (connection point) n3 of the negative side line of the power supply circuit 1a, the negative side line of the power supply circuit 1b, and a negative side line of the power supply circuit 1c, and limits a rush current.

In FIG. 5, the negative side lines of the respective power supply circuits 1a to 1c are connected at the one joining point (connection point) n3, but a first connection point at which the negative side line of the power supply circuit 1a is connected to the negative side line of the power supply circuit 1b may be different from a second connection point at which the negative side line of the power supply circuit 1b is connected to the negative side line of the power supply circuit 1c, for example.

In this case, for example, the rush current prevention circuit 12 is disposed to be closer to the AC power supply side than the first connection point and the second connection point. With this configuration, the rush current prevention circuit 12 is not required to be disposed for each line, and the switching power supply device 200 can be downsized.

The rush current prevention circuit 12 is not necessarily disposed to be closer to the AC power supply side than the first connection point and the second connection point, and may be disposed at another position. For example, the rush current prevention circuit 12 may be disposed in each of the negative side line of the power supply circuit 1a, the negative side line of the power supply circuit 1b, and the negative side line of the power supply circuit 1c.

In the present embodiment, the switching circuits 7 and 7a switch among the first mode and the second mode described in the first embodiment, and a third mode in which the power supply circuits 1a, 1b, and 1c are driven in a case in which the AC power supply is the three-phase AC power supply 10c.

The example of the configuration of the switching power supply device 200 has been described above.

Operation of Switching Power Supply Device 200

Figure 9:
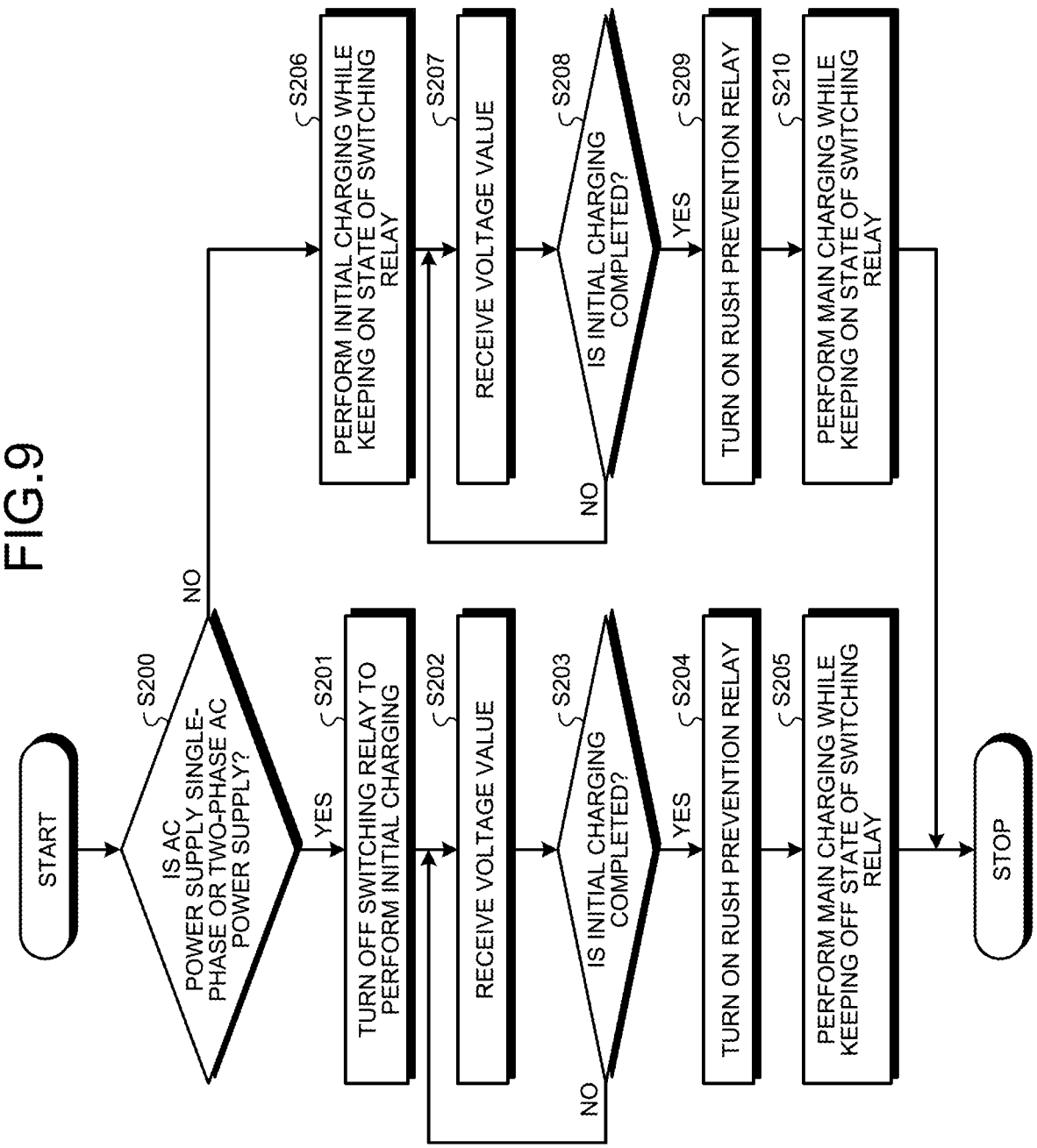
FIG. 9 is a flowchart illustrating an operation example of the switching power supply device according to the second embodiment.

Next, the following describes an example of an operation of the switching power supply device 200 with reference to FIG. 9. FIG. 9 is a flowchart illustrating an operation example of the switching power supply device 200. The operation described below is started at the time of connection of the AC power supply.

First, the control unit 17 determines specifications of the connected AC power supply (Step S200). Specifically, the control unit 17 determines whether the AC power supply is the single-phase AC power supply 10a, the two-phase AC power supply, or the three-phase AC power supply.

The control unit 17 determines whether the AC power supply is the single-phase AC power supply 10a, the two-phase AC power supply 10b, or the three-phase AC power supply 10c based on the voltage value output from the voltmeter 5 that measures the voltage of the electrolytic capacitor 4, for example.

At the time of start of the flowchart, the switching relays 8 and 8a are in the ON state as illustrated in FIG. 8. Thus, in a case in which the switching power supply device 200 is connected to the single-phase AC power supply 10a (in a case in which the positive side of the single-phase AC power supply 10a is connected to the power supply line L1, for example), a positive voltage value is output to the control unit 17 from the voltmeter 5 that measures the voltage of the electrolytic capacitor 4 included in the power supply circuit 1a.

In this case, the single-phase AC power supply is not connected to the power supply circuits 1b and 1c (the positive side of the single-phase AC power supply 10a is not connected to the power supply line L2 and the power supply line L3), so that a voltage value of 0 is output to the control unit 17 from the voltmeter 5 that measures the voltage of the electrolytic capacitor 4 included in each of the power supply circuits 1b and 1c.

In a case in which the switching power supply device 200 is connected to the two-phase AC power supply 10b (in a case in which the positive sides of respective phases of the two-phase AC power supply 10b are connected to the power supply line L1 and the power supply line L2), a positive voltage value is output to the control unit 17 from the voltmeter 5 that measures the voltage of the electrolytic capacitor 4 included in each of the power supply circuits 1a and 1b.

In this case, a voltage value of 0 is output to the control unit 17 from the voltmeter 5 that measures the voltage of the electrolytic capacitor 4 included in the power supply circuit 1c.

In a case in which the switching power supply device 200 is connected to the three-phase AC power supply 10c (in a case in which the positive sides of respective phases of the three-phase AC power supply 10c are connected to the power supply line L1, the power supply line L2, and the power supply line L3), a positive voltage value is output to the control unit 17 from the voltmeter 5 that measures the voltage of the electrolytic capacitor 4 included in each of the power supply circuits 1a, 1b, and 1c.

Thus, the control unit 17 can detect which of the single-phase AC power supply 10a, the two-phase AC power supply 10b, and the three-phase AC power supply 10c is connected to the switching power supply device 200 based on the voltage value output from each of the voltmeters 5.

For example, in a case in which the voltage value equal to or smaller than the threshold set in advance is output from one or two of the voltmeters 5 respectively included in the power supply circuits 1a to 1c, it is determined that the switching power supply device 200 is connected to the single-phase AC power supply 10a or the two-phase AC power supply 10b. For example, in a case in which voltage values larger than the threshold set in advance are output from all of the voltmeters 5 respectively included in the power supply circuits 1a to 1c, it is determined that the switching power supply device 200 is connected to the three-phase AC power supply 10c.

The control unit 17 may determine which of the single-phase AC power supply 10a, the two-phase AC power supply 10b, and the three-phase AC power supply 10c is connected to the switching power supply device 200 using a voltmeter other than the voltmeter 5 included in the AC/DC converter 3 or an ammeter.

Next, the control unit 17 performs initial charging of the electrolytic capacitor 4 of the AC/DC converter 3 in accordance with the determined specifications of the AC power supply.

In a case in which the switching power supply device 200 is connected to the single-phase AC power supply 10a or the two-phase AC power supply 10b (Yes at Step S200), the control unit 17 switches the switching relay 8a to be in the OFF state to perform initial charging as illustrated in FIG. 6 or FIG. 7 (Step S201). The switching relay 8 is not distinguished from the switching relay 8a.

Thus, for example, in a case in which the switching power supply device 200 is connected to the single-phase AC power supply 10a, the switching relay 8 may be switched to be in the OFF state in place of the switching relay 8a to perform initial charging.

At the time of start of the flowchart, it is assumed that the switching relays 8 and 8a are in the ON state, and the rush prevention relay 14 is in the OFF state. The reason why the switching relays 8 and 8a are in the ON state at the time of start is the same as the reason why the switching relay 8 is in the ON state at the time of start in the first embodiment, so that description thereof will not be repeated. The reason why the rush prevention relay 14 is in the OFF state at the time of start is also the same as that in the first embodiment. Additionally, Step S202 to Step S204 are the same as Step S102 to Step S104.

The control unit 17 then performs charging (main charging) of the battery 20 while keeping the OFF state of the switching relay 8a (Step S205). In other words, in a case in which the single-phase AC power supply 10a or the two-phase AC power supply 10b is connected to the switching power supply device 200, that is, the number of phases of the connected AC power supply is smaller than the number of the power supply circuits, the control unit 17 controls the switching circuit 7a to connect the power supply circuit as a surplus (for example, any one of or both of the power supply circuits 1b and 1c) to the specific phase (for example, the power supply line L1).

In this way, by charging the battery 20 while causing the switching relay 8a to be in the OFF state, the battery 20 is charged in a state in which not only the power supply filter 2 included in the power supply circuit 1a but also the power supply filter 2 included in the power supply circuit 1c are connected to the single-phase AC power supply 10a. Thus, as compared with a case of performing charging by using only the power supply filter 2 included in the power supply circuit 1a, performance of reducing noise can be improved.

By charging the battery 20 while causing the switching relay 8a to be in the OFF state, the battery 20 is charged while not only the power supply filter 2 included in the power supply circuit 1a but also the power supply filter 2 included in the power supply circuit 1c are kept being connected to the two-phase AC power supply 10b. Thus, as compared with a case of performing charging by connecting the two-phase AC power supply 10b to the power supply circuits 1a and 1b, performance of reducing noise can be improved.

On the other hand, in a case in which the switching power supply device 200 is connected to the three-phase AC power supply 10c (No at Step S200), the control unit 17 performs initial charging while keeping the ON state of the switching relay 8 as illustrated in FIG. 8 (Step S206).

Also in a case in which the switching power supply device 200 is connected to the three-phase AC power supply 10c, the rush prevention relay 14 is in the OFF state, so that electric power supplied from the three-phase AC power supply 10c is supplied to the power supply circuits 1a to 1c via the power supply lines L1 to L3, and is supplied to the rush current limiting resistor of the rush current limiting circuit 13.

Due to this, charging (initial charging) of the electrolytic capacitor 4 of the power supply circuits 1a to 1c can be performed while preventing a rush current from flowing into the power supply circuits 1a to 1c.

Step S207 to Step S209 are the same as Step S107 to Step S109 described above. The control unit 17 then switches the rush prevention relay 14 to be in the OFF state at Step S209, and charges the battery 20 while keeping the ON state of the switching relay 8a (Step S210).

The example of the operation of the switching power supply device 200 has been described above.

In the present embodiment, in the switching power supply device 200 compatible with the single-phase AC power supply 10a, the two-phase AC power supply 10b, and the three-phase AC power supply 10c, the control unit 17 connects, to each phase of the AC power supply, the other power supply circuit corresponding to the phase, and in a case in which the number of phases of the AC power supply is smaller than the number of the power supply circuits, connects the other power supply circuit as a surplus to the specific phase.

That is, the control unit 17 controls the switching circuit 7 to connect the other power supply circuit (the power supply circuits 1b and 1c) other than the specific power supply circuit (the power supply circuit 1a) corresponding to the specific phase (the power supply line L1) to the phase (the power supply lines L2 and L3) corresponding to the other power supply circuit (the power supply circuits 1b and 1c) in a case in which the AC power supply (the three-phase AC power supply 10c) having the same number of phases as the number of the power supply circuits is connected, and to connect the other power supply circuit as a surplus (both of or any one of the power supply circuits 1b and 1c) to the specific phase (the power supply line L1) in a case in which the AC power supply (the single-phase AC power supply 10a and the two-phase AC power supply 10b) having the number of phases smaller than the number of the power supply circuits is connected.

Due to this, in a case in which the single-phase AC power supply 10a or the two-phase AC power supply 10b is connected to the switching power supply device 200, charging can be performed using not only the power supply filter 2 included in the power supply circuit 1a or 1b but also the power supply filter 2 included in the power supply circuit 1c, so that performance of reducing noise can be improved.

Modification of Operation of Switching Power Supply Device 200

Figure 10:
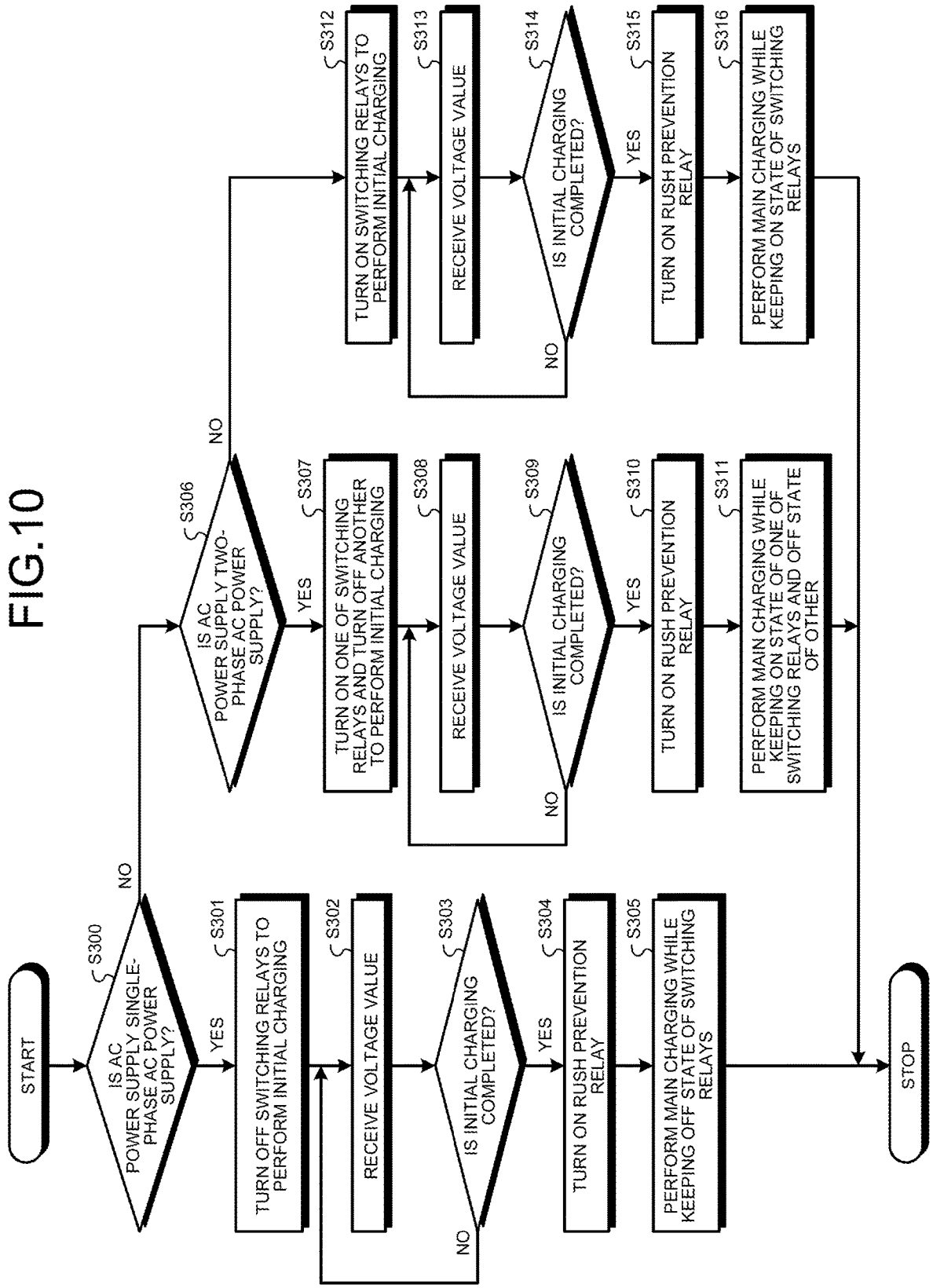
FIG. 10 is a flowchart illustrating an operation example of a switching power supply device according to a modification of the second embodiment.

The switching power supply device 200 may perform an operation in FIG. 10 in place of the operation described in the second embodiment with reference to FIG. 6. FIG. 10 is a flowchart illustrating an operation example of the switching power supply device 200 according to a modification of the second embodiment.

First, the control unit 17 determines specifications of the connected AC power supply. Specifically, the control unit 17 determines whether the AC power supply is the single-phase AC power supply 10a (Step S300). In this point, the present modification is different from the second embodiment in which it is determined whether the AC power supply is the single-phase AC power supply 10a or the two-phase AC power supply 10b.

In a case in which the switching power supply device 200 is connected to the single-phase AC power supply 10a (Yes at Step S300), the control unit 17 switches both of the switching relays 8 and 8a to be in the OFF state to perform initial charging (Step S301).

Due to this, even in a case in which the switching power supply device 200 is connected to the single-phase AC power supply 10a, initial charging of the electrolytic capacitors 4 respectively included in the power supply circuits 1a to 1c can be performed.

At Step S301, it is preferable to control the switching relays 8 and 8a at different timings. This is because a rush current is increased if the switching relays 8 and 8a are switched to be in the OFF state at the same time.

Step S302 to Step S304 are the same as Step S202 to Step S204, so that description thereof will not be repeated. After initial charging of the electrolytic capacitor 4 is completed, the rush prevention relay 14 is switched to be in the ON state (Step S304).

The control unit 17 then performs charging (main charging) of the battery 20 while keeping the OFF state of the switching relays 8 and 8a (Step S305). In other words, in a case in which the single-phase AC power supply 10a or the two-phase AC power supply 10b is connected to the switching power supply device 200, the control unit 17 makes the rush prevention relay 14 of the rush current prevention circuit 12 conductive while keeping the power supply circuit as a surplus (for example, any one of or both of the power supply circuits 1b and 1c) being connected to the specific phase (the power supply line L1).

By charging the battery 20 while causing the switching relays 8 and 8a to be in the OFF state, the battery 20 is charged while not only the power supply filter 2 included in the power supply circuit 1a but also the power supply filters 2 respectively included in the power supply circuits 1b and 1c are kept being connected to the single-phase AC power supply 10a. Thus, as compared with a case of performing charging using only the power supply filter 2 included in the power supply circuit 1a, performance of reducing noise can be significantly improved.

In a case in which the switching power supply device 200 is not connected to the single-phase AC power supply 10a (No at Step S300), it is determined whether the switching power supply device 200 is connected to the two-phase AC power supply 10b (Step S306).

In a case in which the switching power supply device 200 is connected to the two-phase AC power supply 10b (Yes at Step S306), the control unit 17 switches the switching relay 8a to be in the OFF state to perform initial charging while keeping the ON state of the switching relay 8 (Step S307).

Step S308 to Step S310 are the same as Step S302 to Step S304, so that description thereof will not be repeated. After initial charging of the electrolytic capacitor 4 is completed, the rush prevention relay 14 is switched to be in the ON state (Step S310).

The control unit 17 then turns ON the switching relay 8 to perform charging (main charging) of the battery 20 while keeping the OFF state of the switching relay 8a (Step S311). In other words, in a case in which the switching power supply device 200 is connected to the two-phase AC power supply 10b, the control unit 17 makes the rush prevention relay 14 of the rush current prevention circuit 12 conductive while keeping the power supply circuit as a surplus (for example, the power supply circuit 1c) being connected to the specific phase (the power supply line L1).

In a case in which the switching power supply device 200 is connected to the three-phase AC power supply (No at Step S306), the control unit 17 performs initial charging while keeping the ON state of the switching relays 8 and 8a (Step S312).

Step S313 to Step S315 are the same as Step S207 to Step S209. The control unit 17 then switches the rush prevention relay 14 to be in the ON state at Step S315, and performs charging (main charging) of the battery 20 while keeping the ON state of the switching relays 8 and 8a (Step S316).

The modification of the operation of the switching power supply device 200 has been described above.

Third Embodiment

Figure 11:
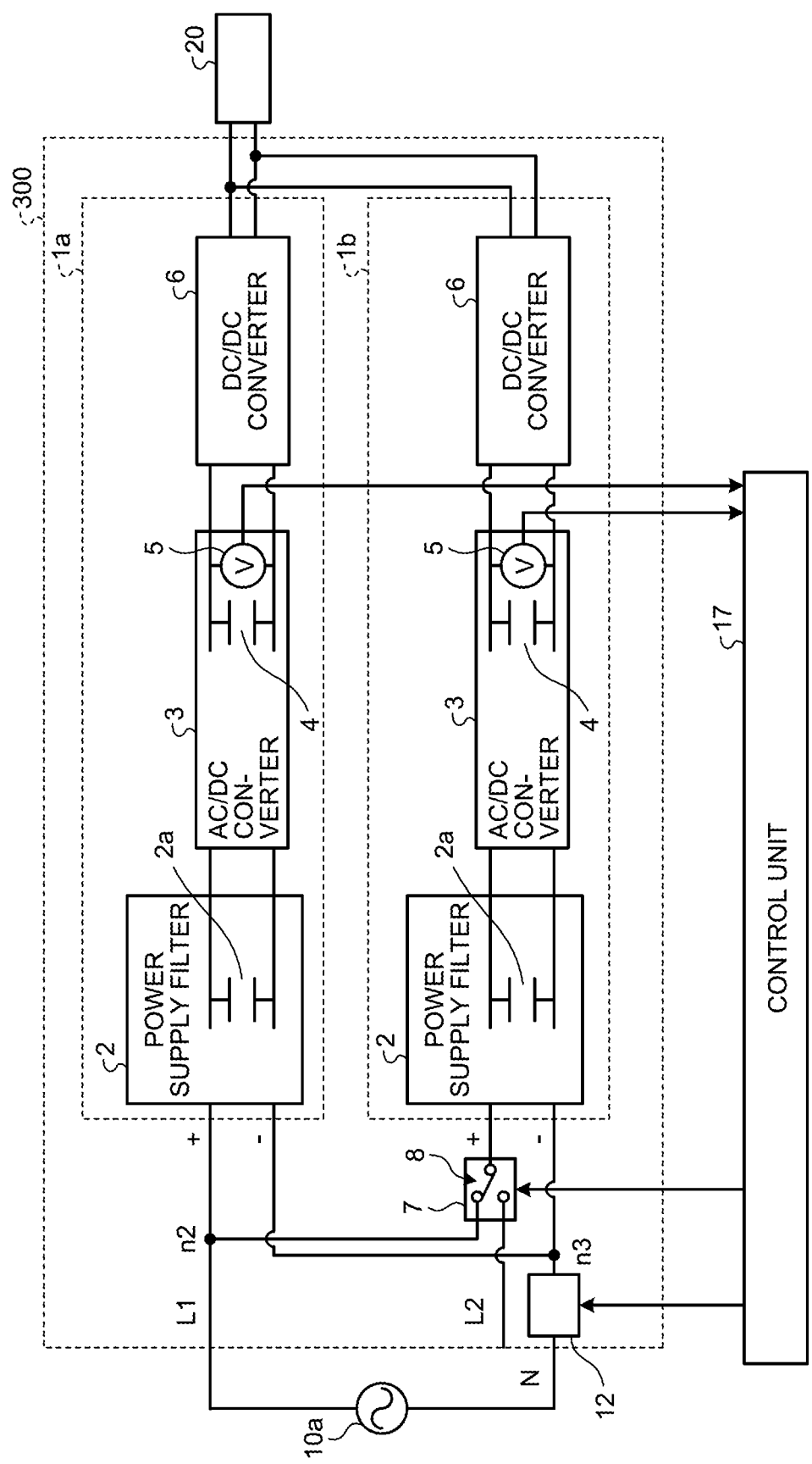
FIG. 11 is a circuit diagram illustrating a case in which a switching power supply device according to a third embodiment is connected to a single-phase AC power supply.
Figure 12:
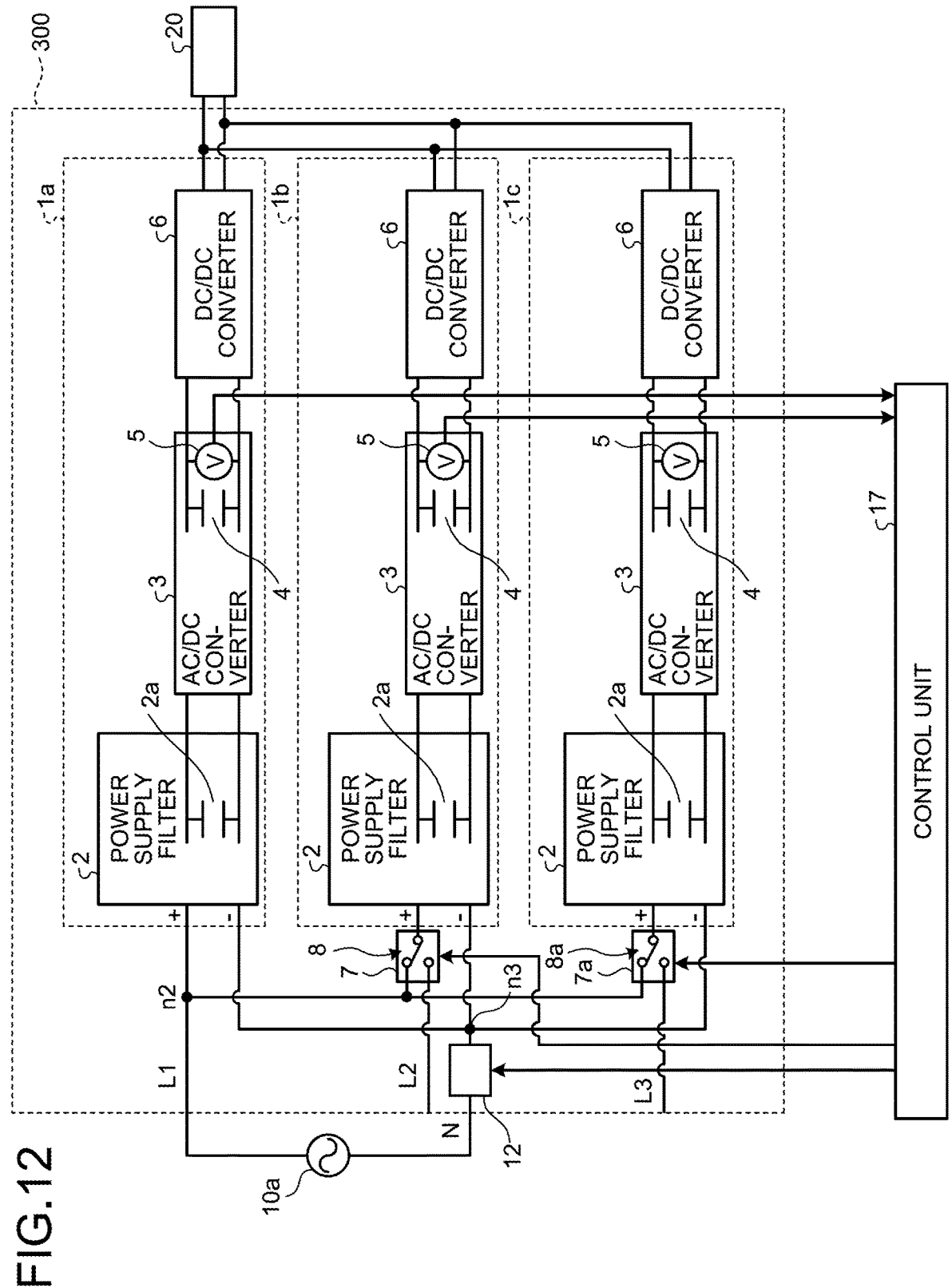
FIG. 12 is a circuit diagram illustrating a case in which the switching power supply device according to the third embodiment is connected to the single-phase AC power supply.

In a switching power supply device 300 according to the present embodiment, a Y capacitor 2a is used for the power supply filter 2 as illustrated in FIG. 11. The present embodiment is different from the first embodiment and the second embodiment in that the switching relay 8 (and 8a) is turned OFF after initial charging only in a case in which the voltage value of the external AC power supply is equal to or smaller than the predetermined value. FIG. 11 illustrates the power supply circuits (the power supply circuits 1a and 1b) arranged in two lines, but the embodiment is not limited thereto. As illustrated in FIG. 12, the power supply circuits (the power supply circuits 1a to 1c) may be arranged in three lines. The following describes an example of a configuration in a case in which the power supply circuits (the power supply circuits 1a to 1c) are arranged in three lines.

Each of Y capacitors 2a included in the power supply circuits (the power supply circuits 1a to 1c) is grounded on a vehicle. In the related art, in a case in which the switching power supply device is connected to the single-phase AC power supply 10a, for example, one line of the power supply circuits (the power supply circuits 1a to 1c) arranged in three lines is connected to the single-phase AC power supply 10a to charge a battery.

In a case of connecting one line (for example, the power supply circuit 1a) of the power supply circuits (the power supply circuits 1a to 1c) arranged in three lines to the positive side of the single-phase AC power supply 10a, electric power is supplied to only a grounding power line corresponding to one Y capacitor 2a connected to the single-phase AC power supply 10a among three Y capacitors 2a included in the power supply circuits (the power supply circuits 1a to 1c).

On the other hand, in a case of connecting two lines (for example, the power supply circuits 1a and 1c) or three lines (the power supply circuits 1a, 1b, and 1c) of the power supply circuits (the power supply circuits 1a to 1c) arranged in three lines to the positive side of the single-phase AC power supply 10a, electric power is supplied to grounding power lines corresponding to two or three of the Y capacitors 2a connected to the single-phase AC power supply 10a among the three Y capacitors 2a included in the power supply circuits (the power supply circuits 1a to 1c).

Thus, total capacitance between the power line to which electric power of the single-phase AC power supply (10a) is supplied and the grounding line varies between a case of connecting one line (for example, the power supply circuit 1a) of the power supply circuits (the power supply circuits 1a to 1c) arranged in three lines to the positive side of the single-phase AC power supply 10a and a case of connecting two lines (for example, the power supply circuits 1a and 1c) or three lines (the power supply circuits 1a, 1b, and 1c) of the power supply circuits (the power supply circuits 1a to 1c) arranged in three lines to the positive side of the single-phase AC power supply 10a.

Specifically, the total capacitance is capacitance of only the Y capacitor 2a in one grounding power line in a case of connecting one line (for example, the power supply circuit 1a) of the power supply circuits (the power supply circuits 1a to 1c) to the positive side of the single-phase AC power supply 10a, while the total capacitance is total capacitance of the three Y capacitors 2a in the respective three grounding power lines in a case of connecting three lines (the power supply circuits 1a, 1b, and 1c) of the power supply circuits (the power supply circuits 1a to 1c) to the positive side of the single-phase AC power supply 10a.

That is, the total capacitance of the Y capacitors 2a in a case of connecting three lines (1a, 1b, and 1c) of the power supply circuits (the power supply circuits 1a to 1c) to the positive side of the single-phase AC power supply 10a is three times the capacitance of the Y capacitor 2a in a case of connecting one line (for example, the power supply circuit 1a) of the power supply circuits (the power supply circuits 1a to 1c) to the positive side of the single-phase AC power supply 10a.

Similarly, the total capacitance of the Y capacitors 2a in a case of connecting two lines (the power supply circuits 1a and 1c) of the power supply circuits (the power supply circuits 1a to 1c) to the positive side of the single-phase AC power supply 10a is two times the capacitance of the Y capacitor 2a in a case of connecting one line (for example, the power supply circuit 1a) of the power supply circuits (the power supply circuits 1a to 1c) to the positive side of the single-phase AC power supply 10a.

From the above viewpoint, when two lines (for example, the power supply circuits 1a and 1c) or three lines (the power supply circuits 1a, 1b, and 1c) of the power supply circuits (the power supply circuits 1a to 1c) arranged in three lines are connected to the positive side of the single-phase AC power supply 10a to charge the battery 20, a leakage current (for example, a contact current) may be increased as compared with a case of connecting one line (for example, the power supply circuit 1a) of the power supply circuits (the power supply circuits 1a to 1c) arranged in three lines to the positive side of the single-phase AC power supply 10a to charge the battery 20.

Additionally, the leakage current is increased in proportion to the voltage value of the external AC power supply. Thus, in a case in which the voltage value of the external AC power supply is large, it may be preferable not to switch the switching relay 8 and the switching relay 8a to be in the OFF state to perform initial charging at Step S101 in the first embodiment and Step S201 in the second embodiment in some cases.

It may be preferable not to charge the battery 20 in a state of keeping the OFF state of the switching relays 8 and 8a at Step S105 in the first embodiment and Step S205 in the second embodiment in some cases.

Thus, in a case in which the switching power supply device 300 according to the present embodiment is connected to the single-phase AC power supply 10a or the two-phase AC power supply 10b, and the voltage value of the single-phase AC power supply 10a or the two-phase AC power supply 10b is equal to or smaller than the predetermined value (for example, 240 V), the control unit 17 connects the power supply circuit as a surplus (for example, the power supply circuit 1c) not corresponding to the phase of the single-phase AC power supply 10a or the two-phase AC power supply 10b to the specific phase (for example, the power supply line L1) to perform initial charging of the electrolytic capacitor 4.

Alternatively, in a case in which the switching power supply device 300 is connected to the single-phase AC power supply 10a or the two-phase AC power supply 10b, and the voltage value of the single-phase AC power supply 10a or the two-phase AC power supply 10b is equal to or smaller than the predetermined value (for example, 240 V), the control unit 17 may connect the power supply circuit as a surplus (for example, the power supply circuit 1c) to the specific phase (for example, the power supply line L1) to charge the battery 20 after initial charging of the electrolytic capacitor 4.

In a case in which the switching power supply device 300 is connected to the single-phase AC power supply 10a, the switching relay 8a, together with the switching relay 8, may also be controlled to switch the power supply circuit as a surplus (for example, the power supply circuits 1b and 1c) not corresponding to the specific phase (for example, the power supply line L1) to be connected to the specific phase (for example, the power supply line L1).

The voltage value of the AC power supply may be received from the voltmeter 5, or a voltmeter other than the voltmeter 5 may be disposed. The voltage value is output to the control unit 17, and the control unit 17 controls the switching relay 8 or the switching relay 8a based on the voltage value.

In the present embodiment, in a case in which the switching power supply device 300 in which the power supply filter 2 includes the Y capacitor 2a is connected to the single-phase AC power supply 10a or the two-phase AC power supply 10b, and the voltage value of the single-phase AC power supply 10a is equal to or smaller than the predetermined value, the control unit 17 connects, to each phase of the AC power supply, the other power supply circuit corresponding to the phase, and connects the other power supply circuit as a surplus to the specific phase in a case in which the number of phases of the AC power supply is smaller than the number of the power supply circuits.

That is, in a case in which the AC power supply (the single-phase AC power supply 10a, the two-phase AC power supply 10b) having the number of phases smaller than the number of the power supply circuits is connected, and the voltage value of the single-phase AC power supply 10a is equal to or smaller than the predetermined value, the control unit 17 controls the switching circuit 7 to connect the other power supply circuit as a surplus (both of or any one of the power supply circuits 1b and 1c) to the specific phase (the power supply line L1).

Due to this, in a case in which the single-phase AC power supply 10a or the two-phase AC power supply 10b is connected to the switching power supply device 300, charging can be performed by using not only the power supply filter 2 of the power supply circuit to which the AC power supply is connected but also the power supply filter 2 including the power supply circuit as a surplus, so that performance of reducing noise can be improved. Accordingly, the switching power supply device 300 can reduce a leakage current.

The embodiments of the present disclosure have been described above, but the present invention is not limited to the embodiments described above. Various modifications can be made without departing from the gist of the present invention.

For example, in the embodiments described above, exemplified is a case in which the power supply circuit 1a, the power supply circuit 1b, and the power supply circuit 1c are connected to the power supply line L1 (the specific phase) at the time of performing initial charging of the capacitor, but the embodiment is not limited thereto. For example, a configuration may be such that the power supply circuit 1a, the power supply circuit 1b, and the power supply circuit 1c are connected to the power supply line L2 or the power supply line L3 at the time of performing initial charging of the capacitor.

That is, a configuration may be such that the power supply circuits (the power supply circuits 1a to 1c) are connected between the specific phase (the power supply line L1) and the neutral point n1 at the time of performing initial charging of the capacitor. The number of power supply circuits (the power supply circuits 1a to 1c) may be plural, that is, two or more. The polyphase AC power supply is not limited to the two-phase AC power supply 10b or the three-phase AC power supply 10c, and may have a plurality of phases equal to or larger than two.

According to the present disclosure, performance of the noise filter can be improved without newly disposing a noise filter.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A switching power supply device comprising:
a plurality of power supply circuits corresponding to respective phases of a polyphase AC power supply as an external power supply, each of the power supply circuits including a filter circuit, a voltmeter, and an AC/DC converter configured to convert AC power output from the filter circuit into DC power, and the voltmeter measures a voltage of an output capacitor included in the AC/DC converter;
a switching circuit configured to be able to switch a connection destination of another power supply circuit other than a specific power supply circuit corresponding to a specific phase of the external power supply among the power supply circuits to a phase corresponding to the other power supply circuit or the specific phase;
a rush current prevention circuit configured to prevent a rush current, the rush current prevention circuit being disposed on a power supply line on a negative side of the external power supply and at a position closer to the external power supply than a connection point to which the power supply circuits are connected; and
a control unit configured to control the switching circuit in accordance with a number of phases of the external power supply connected to the switching power supply device, wherein:
the control unit is configured to connect, to each phase of the external power supply connected to the switching power supply device, the other power supply circuit corresponding to the phase, and connect the other power supply circuit as a surplus to the specific phase when the number of phases of the external power supply connected to the switching power supply device is smaller than a number of the power supply circuits,
the control unit is configured to determine the number of phases of the external power supply connected to the switching power supply device based on the voltage value measured by the voltmeter, and
the control unit is configured to connect the other power supply circuit to the specific phase and make a relay included in the rush current prevention circuit nonconductive to perform initial charging of the output capacitor, and make the relay of the rush current prevention circuit conductive while keeping the other power supply circuit as a surplus being connected to the specific phase after the initial charging of the output capacitor when the number of phases of the external power supply connected to the switching power supply device is smaller than the number of the power supply circuits, and
the control unit is configured to connect the other power supply circuit to the specific phase to perform the initial charging of the output capacitor when a voltage value of the external power supply is equal to or smaller than a predetermined value.

2. The switching power supply device according to claim 1, wherein, when a single-phase AC power supply is connected to the switching power supply device, the control unit is configured to connect the other power supply circuit to the specific phase corresponding to the single-phase AC power supply.

3. The switching power supply device according to claim 2, wherein the filter circuit comprises an X capacitor or a Y capacitor.

4. The switching power supply device according to claim 2, wherein
the plurality of power supply circuits includes three or more power supply circuits, and the switching circuit includes switching circuits that are disposed for other power supply circuits except for the specific power supply circuit.

5. The switching power supply device according to claim 1, wherein the filter circuit comprises an X capacitor or a Y capacitor.

6. The switching power supply device according to claim 1, wherein
the plurality of power supply circuits includes three or more power supply circuits, and
the switching circuit includes switching circuits that are disposed for other power supply circuits except for the specific power supply circuit.

7. The switching power supply device according to claim 6, wherein the control unit is configured to control the switching circuits at different timings.

8. A vehicle comprising: the switching power supply device according to claim 1.

9. A control method performed by a switching power supply device, the switching power supply device includes:
a plurality of power supply circuits corresponding to respective phases of a polyphase AC power supply as an external power supply, each of the power supply circuits including a filter circuit, a voltmeter, and an AC/DC converter configured to convert AC power output from the filter circuit into DC power, and the voltmeter measures a voltage of an output capacitor included in the AC/DC converter;
a switching circuit configured to be able to switch a connection destination of another power supply circuit other than a specific power supply circuit corresponding to a specific phase of the external power supply among the power supply circuits to a phase corresponding to the other power supply circuit or the specific phase;
a rush current prevention circuit configured to prevent a rush current, the rush current prevention circuit being disposed on a power supply line on a negative side of the external power supply and at a position closer to the external power supply than a connection point to which the power supply circuits are connected;
a control unit configured to control the switching circuit in accordance with a number of phases of the external power supply connected to the switching power supply device based on the voltage value measured by the voltmeter; and
the control unit configured to perform the control method, the control method comprising:
controlling the switching circuit to connect, to each phase of the external power supply connected to the switching power supply device, the other power supply circuit corresponding to the phase, and to connect the other power supply circuit as a surplus to the specific phase when a number of phases of the external power supply connected to the switching power supply device is smaller than a number of the power supply circuits;
determining the number of phases of the external power supply connected to specific phase and making a relay included in the rush current prevention circuit nonconductive to perform initial charging of the output capacitor, and making the relay of the rush current prevention circuit conductive while keeping the other power supply circuit as a surplus being connected to the specific phase after the initial charging of the output capacitor when the number of phases of the external power supply connected to the switching power supply device is smaller than the number of the power supply circuits; and
connecting the other power supply circuit to the specific phase to perform the initial charging of the output capacitor when a voltage value of the external power supply is equal to or smaller than a predetermined value.

* * * * *